United States Patent
Burczyk et al.

(10) Patent No.: US 8,882,140 B2
(45) Date of Patent: Nov. 11, 2014

(54) BELT STRAP FOR A SAFETY BELT OF A VEHICLE

(75) Inventors: Christian Burczyk, Stuttgart (DE); Hakan Ipek, Schoenaich (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/812,171

(22) PCT Filed: Jul. 30, 2011

(86) PCT No.: PCT/EP2011/003835
§ 371 (c)(1),
(2), (4) Date: Jan. 25, 2013

(87) PCT Pub. No.: WO2012/016672
PCT Pub. Date: Feb. 9, 2012

(65) Prior Publication Data
US 2013/0113194 A1   May 9, 2013

(30) Foreign Application Priority Data
Aug. 6, 2010 (DE) .......................... 10 2010 033 595

(51) Int. Cl.
*B60R 21/18* (2006.01)
(52) U.S. Cl.
USPC ........................................... 280/733
(58) Field of Classification Search
USPC ........................................... 280/733
See application file for complete search history.

(56) References Cited

U.S. PATENT DOCUMENTS

| | | | |
|---|---|---|---|
| 3,801,156 A * | 4/1974 | Granig | 280/733 |
| 3,820,842 A * | 6/1974 | Stephenson | 280/733 |
| 3,933,370 A * | 1/1976 | Abe et al. | 280/733 |
| 5,466,003 A | 11/1995 | Tanaka et al. | |
| 5,474,326 A | 12/1995 | Cho | |
| 6,126,194 A | 10/2000 | Yaniv et al. | |
| 6,340,173 B1 | 1/2002 | Specht | |
| 6,402,194 B1 | 6/2002 | Takeuchi | |
| 6,419,264 B1 * | 7/2002 | Tsuji et al. | 280/733 |
| 2013/0106083 A1 | 5/2013 | Burczyk et al. | |
| 2013/0134695 A1 | 5/2013 | Burczyk | |

FOREIGN PATENT DOCUMENTS

| | | |
|---|---|---|
| DE | 100 51 142 A1 | 5/2001 |
| DE | 10 2010 023 875 A1 | 12/2011 |
| DE | 10 2010 026 546 A1 | 1/2012 |
| EP | 1 053 133 B1 | 9/2001 |
| GB | 2 269 791 A | 2/1994 |
| WO | WO 2008/120417 A1 | 10/2008 |

OTHER PUBLICATIONS

International Search Report with English translation dated Dec. 12, 2011 (six (6) pages).
German-language Office Action dated May 22, 2013 (four (4) pages).

* cited by examiner

*Primary Examiner* — Faye M. Fleming
(74) *Attorney, Agent, or Firm* — Crowell & Moring LLP

(57) ABSTRACT

A belt strap for a safety belt of a vehicle includes a belt interior located between two belt strap layers, to which belt interior a gas can be applied. A gas passage connecting at least two sections of the belt interior is provided between the at least two belt strap layers. The gas passage is secured at a first end in the region of an end fitting of the safety belt. The gas passage, which is designed as a flexible tube, is secured within the belt interior with at least a second end, which is located opposite the secured first end.

7 Claims, 2 Drawing Sheets

BELT STRAP FOR A SAFETY BELT OF A VEHICLE

BACKGROUND AND SUMMARY OF THE INVENTION

Figure 1:
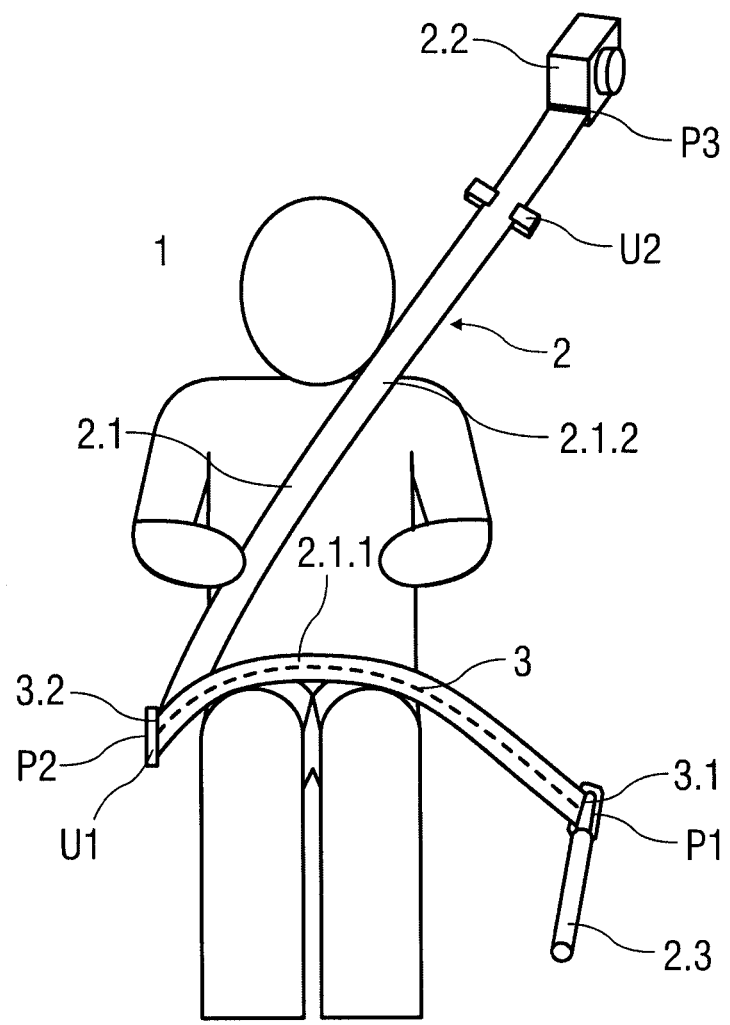

Exemplary embodiments of the present invention relate to a belt strap for a seat belt of a vehicle, wherein the belt strap comprises a belt interior to which a gas can be applied, a gas passage connecting at least two sections of the belt interior is provided between the at least two belt strap layers, the gas passage is fastened at a first end in the region of an end fitting of the seat belt, and the gas passage is at least indirectly connected to a gas generator.

European Patent Document EP 1 053 133 B1 describes a three-point belt with shoulder and lap belt parts of a belt strap, which are inflatable at least in the shoulder belt region. At a deflection point, the seat belt is provided with an insertion part that can be inserted into a buckle, the belt strap being deflected in a transitional region from the lap belt part to the shoulder belt part at the deflection point if the seat belt is fastened. In the region of the insertion part, the belt strap is provided at the deflection point with a gas passage for establishing a gas flow connection between the belt interiors of the shoulder belt part and the lap belt part. An opening cross-section of the gas passage is smaller than the cross-section of a filled belt interior, which can be filled continuously and extends in the belt strap that forms the shoulder and lap belt parts as well as in the transitional region. At least in the belt interior of the transitional region guided around the deflection point, the gas passage forms a radially reinforced gas line via the opening cross-section of which the interiors of the shoulder belt part and the lap belt part can be inflated. The gas passage consists of a tubular piece having a relatively high rigidity in the radial direction, so that the opening cross-section formed by the gas passage does not collapse as the belt strap is deflected about the deflection point. The seat belt further comprises a gas feed in the region of an end of the lap belt part which is opposite the transitional region.

Exemplary embodiments of the present invention are directed to a seat belt for a vehicle which is improved compared to prior art.

In accordance with exemplary embodiments of the present invention, a belt strap for a seat belt of a vehicle comprises a belt interior to which a gas can be applied, wherein a gas passage connecting at least two sections of the belt interior is provided between the at least two belt strap layers, wherein the gas passage is fastened at a first end in the region of an end fitting of the seat belt and at least indirectly connected to a gas generator. According to the invention, the gas passage is designed as a flexible tube that is additionally secured within the belt interior.

As the tube is additionally secured within the belt interior, it is secured against slipping at least within the belt interior when acting as a gas supply line.

This additional securing arrangement further ensures that the filling of the belt interior of the belt strap is improved because a movement of a tube end is avoided. The so-called whiplash effect, i.e. a whipping-about of the tube end within the belt strap, is largely prevented, thereby also preventing to a large extent any damage to the belt strap in this region. Any relative movement between the belt strap and the tube is prevented or at least reduced by this securing arrangement.

BRIEF SUMMARY OF THE DRAWING FIGURES

An embodiment of the invention is explained in greater detail below with reference to the drawings.

Figure 2:
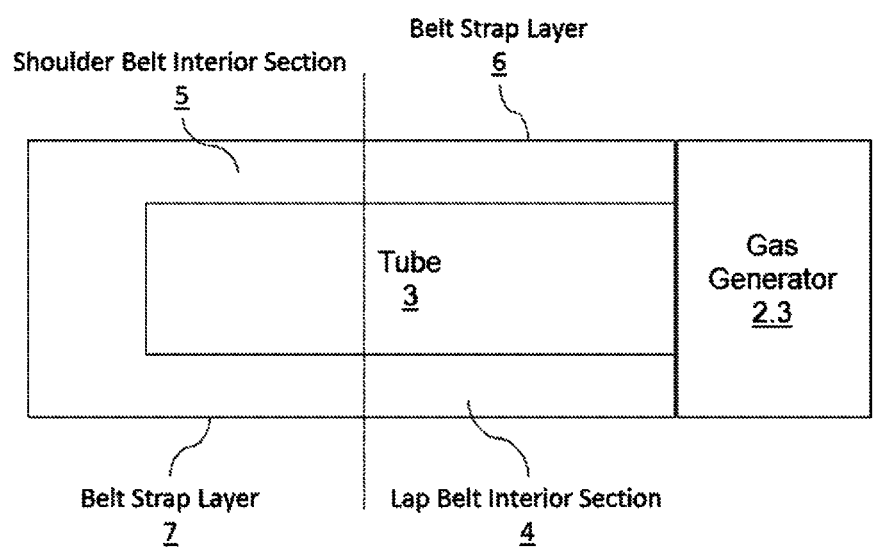

Of the drawings:

FIG. 1 is a diagrammatic representation of a vehicle occupant wearing a seat belt which comprises a belt strap according to the invention; and FIG. 2 is a highly schematic diagram of belt layers and a gas passage allowing gas from the gas generator to pass from the lap belt interior section to the shoulder belt interior section.

DETAILED DESCRIPTION

FIG. 1 shows a vehicle occupant 1 in a vehicle not shown in the drawing, who wears a seat belt 2.

The seat belt 2 is a so-called three-point belt that ties the vehicle occupant 1 to a vehicle body at three points P1 to P3.

A first point P1 is located in the lower region on a B-post of the vehicle. At this point P1, the belt strap 2.1 of the seat belt 2 is secured to the vehicle body.

From this point P1, the belt strap 2.1 is routed across a lap region of the vehicle occupant 1 to a second point P2, which is represented by a buckle mounted on the vehicle body and preferably provided with an integrated tensioner not shown in the drawing. A so-called latch plate engages the belt buckle. The section of the belt strap 2.1 which is routed across the lap region of the vehicle occupant 1 is hereinafter referred to as lap belt region 2.1.1 and is provided for the restraint of the lap region of the vehicle occupant 1.

The belt strap 2.1 is routed through an opening in the latch plate, (not shown in the drawing), and deflected there. The latch plate forms a lower deflection point U1.

From the lower deflection point U1, the belt strap 2.1 is routed across an upper body region of the vehicle occupant 1 to an upper deflection point U2, which forms the third point P3. The section of the belt strap 2.1 between the second point P2 and the third point P3 is hereinafter referred to as shoulder belt region 2.1.2 and is provided for the restraint of the upper body region of the vehicle occupant 1.

From the upper deflection point U2, the belt strap 2.1 is routed to a belt retractor 2.2. The belt retractor 2.2 is provided to retract the belt strap 2.1 of the seat belt 2 when not in use and to tension the belt strap 2.1 at the body of the vehicle occupant 1 when the seat belt 2 is fastened. The belt retractor 2.2 preferably includes a so-called retractor tensioner (not shown in the drawing), by means of which the belt strap 2.1 can, if the vehicle collides with an obstacle, be tensioned in such a way that the vehicle occupant 1 is optimally positioned in the vehicle seat S, resulting in an optimized restraint of the vehicle occupant 1.

In order to reduce a loading of the vehicle occupant 1 if the vehicle collides with an obstacle, the belt strap 2.1 is inflatable and, on detecting a collision or an imminent, unavoidable collision, can be filled with a gas in advance and then unfolds. For this purpose, a gas generator 2.3 is provided, which is mounted in the region of the end fitting, i.e. in the region of the first point P1. As illustrated in FIG. 2, by means of the tube 3, gas from the gas generator 2.3 passes from the lap interior section 4 to the shoulder belt interior section 5, which are formed between belt strap layers 6.7 of the belt strap 2.1.

If the vehicle collides with an obstacle, several of the folded layers of the belt strap 2.1 (not shown in detail) unfold as the belt interior is filled with the gas, thereby increasing a surface of the belt strap 2.1 when restraining the vehicle occupant 1.

As the belt interior is filled with the gas, it expands in such a way that tear-open threads in the folded layers brake in a defined manner when a preset deformation of the belt strap 2.1 is reached, whereby the seams are destroyed. The preset deformation of the belt strap 2.1 coincides with the reaching of a preset minimum pressure in the belt interior, wherein, due to the deformation of the belt strap 2.1 into the folded layers, tensile forces acting on the tear-open threads are generated, which tensile forces break the tear-open threads which fix the folding of the belt strap 2.1. In this way, the belt strap 2.1 is unfolded by opening the folded layers.

The region in which the belt strap 2.1 is folded extends to the upper deflection point U2.

To feed the gas into the belt interior, the belt interior is connected to the gas generator 2.3, which introduces the gas into the belt interior when a collision is detected or earlier.

The gas generator 2.3 is located at the mounting point of the belt strap 2.1, i.e. at point P1. In order to unfold the belt strap 2.1, the gas is introduced by the gas generator 2.3 through the belt interior into the shoulder belt region 2.1.2 of the belt strap 2.1.

In order to also feed the gas through the lower deflection point U1, i.e. in the region where the belt strap 2.1 is deflected, a gas passage designed as a flexible tube 3 is provided within the belt interior in the region of the lower deflection point U1. This tube 3 connects the belt interior separated by the deflection and by the tensile load acting on the belt strap 2.1. This means that the sections of the belt interior located in the shoulder belt region 2.1.2 and in the lap belt region 2.1.1 are connected to each other. The tube is flexible but still rigid enough to ensure that it always has an open cross-section.

The tube 3 is installed flat between the belt strap layers, preferably in the central part of the folded layers of the unfolded belt strap 2.1. By its first end 3.1, the tube is secured to the end fitting, i.e. to the first point P1. A second end 3.2 of the tube 3, which is located opposite the first end 3.1, is secured within the belt interior to a belt strap layer, so that a relative movement between the belt strap 2.1 and the tube 3 is prevented or at least reduced. The second end 3.2 is preferably bonded to one of the belt strap layers. In this way, the second end 3.2 is fixed and secured against slipping, for example in the production or assembly process or during the use of the belt strap 2.1. As a result of the fixing of the second end 3.2, a proper filling of the belt interior is ensured to a great degree. Furthermore, as the second end 3.2 of the tube 3 is secured, the shoulder belt region 2.1.2 can be filled better.

Furthermore, the second end 3.2 of the tube 3 is incapable of uncontrolled movement while the belt interior is being filled, i.e. it cannot whip about in accordance with the so-called whiplash effect, so that damage to at least the fabric of the belt strap layers enclosing the belt interior is largely eliminated.

As an alternative to being secured at the second end 3.2, the tube 3 may be secured to the belt strap layer in sections, at certain points or along its entire length.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A belt strap for a safety belt of a vehicle, the belt strap comprising:
    at least two belt strap layers belt that form a belt interior configured to receive a gas;
    a gas passage, connecting a lap belt interior section and a shoulder belt interior section of the belt interior is configured between the at least two belt strap layers,
    wherein the gas passage is secured at a first end in a region of an end fitting of the safety belt and at least indirectly connected to a gas generator configured to supply the gas to the belt interior,
    wherein the gas passage is a flexible tube that is also secured within the belt interior,
    wherein the gas passage is arranged to allow the gas from the gas generator to pass from the lap belt interior section to the shoulder belt interior section via an interior of the gas passage.

2. The belt strap according to claim 1, wherein at least a second end of the flexible tube, which is located opposite the first end, is secured within the belt interior.

3. The belt strap according to claim 1, wherein the flexible tube is secured to at least one of the at least two belt strap layers in sections, at certain points, or along its entire length.

4. The belt strap according to claim 2, wherein at least the second end is secured to at least one of the at least two belt strap layers by adhesive force.

5. The belt strap of claim 1, wherein the belt strap is fixed to the vehicle at a first point and a third point and the belt strap is a contiguous strap that passes from the first point to the third point through a latch plate configured to be secured to the vehicle at a second point.

6. The belt strap of claim 5, wherein the gas generator is mounted in a region of the first point.

7. The belt strap of claim 1, wherein the flexible tube is arranged at least in the lap belt section of the belt interior.

* * * * *